US010858557B2

(12) United States Patent
Tanabe et al.

(10) Patent No.: US 10,858,557 B2
(45) Date of Patent: Dec. 8, 2020

(54) ADHESIVE AND ADHESIVE TAPE

(71) Applicants: TOYO INK SC HOLDINGS CO., LTD., Tokyo (JP); TOYOCHEM CO., LTD., Tokyo (JP)

(72) Inventors: Shingo Tanabe, Tokyo (JP); Katsunori Fukuta, Tokyo (JP); Chiyo Ishizu, Tokyo (JP); Shuhei Saito, Tokyo (JP)

(73) Assignees: TOYO INK SC HOLDINGS CO., LTD., Tokyo (JP); TOYOCHEM CO., LTD., Tokyo (JP)

(*) Notice: Subject to any disclaimer, the term of this patent is extended or adjusted under 35 U.S.C. 154(b) by 122 days.

(21) Appl. No.: 15/708,148

(22) Filed: Sep. 19, 2017

(65) Prior Publication Data
US 2018/0002582 A1    Jan. 4, 2018

Related U.S. Application Data

(63) Continuation of application No. PCT/JP2016/001483, filed on Mar. 15, 2016.

(30) Foreign Application Priority Data

Mar. 20, 2015 (JP) ................. 2015-058524

(51) Int. Cl.
| C09J 175/08 | (2006.01) |
| C09J 7/30 | (2018.01) |
| C08G 18/42 | (2006.01) |
| C08G 18/44 | (2006.01) |
| C08G 18/48 | (2006.01) |
| C08G 18/12 | (2006.01) |
| C08G 18/73 | (2006.01) |
| C08G 18/40 | (2006.01) |
| C08G 18/76 | (2006.01) |
| C09J 7/20 | (2018.01) |

(52) U.S. Cl.
CPC ............ *C09J 175/08* (2013.01); *C08G 18/12* (2013.01); *C08G 18/4018* (2013.01); *C08G 18/4238* (2013.01); *C08G 18/4277* (2013.01); *C08G 18/44* (2013.01); *C08G 18/4825* (2013.01); *C08G 18/4829* (2013.01); *C08G 18/73* (2013.01); *C08G 18/7642* (2013.01); *C09J 7/20* (2018.01); *C09J 7/30* (2018.01); *C09J 2475/00* (2013.01)

(58) Field of Classification Search
CPC ............... C09J 175/08; C09J 7/20; C09J 7/30
See application file for complete search history.

(56) References Cited

U.S. PATENT DOCUMENTS 8,734,943 B2    5/2014 Umino et al.

| 2009/0208759 | A1* | 8/2009 | Kanagawa | ............... B32B 5/26 428/423.7 |
| 2010/0216905 | A1* | 8/2010 | Kuwamura | ............. B29C 41/18 521/170 |
| 2014/0050919 | A1* | 2/2014 | Umino | ................... B32B 27/00 428/355 EP |

FOREIGN PATENT DOCUMENTS

| CN | 101007934 | | 8/2007 |
| CN | 103492444 | | 1/2014 |
| CN | 103650156 | | 3/2014 |
| CN | 103666360 | | 3/2014 |
| JP | 11241057 | A * | 9/1999 |
| JP | 2005-089573 | | 4/2005 |
| JP | 2006/182795 | | 7/2006 |
| JP | 2009-281575 | | 12/2009 |
| JP | 2011-190420 | | 9/2011 |
| JP | 2013-060521 | | 4/2013 |
| JP | 2013-125118 | | 6/2013 |
| JP | 2014-028876 | | 2/2014 |
| JP | 2015-007226 | | 1/2015 |
| WO | 2012144329 | | 10/2012 |

OTHER PUBLICATIONS

Translation of JP 11241057A (Year: 1999).*
"Written Opinion of the International Searching Authority (Form PCT/ISA/237)" of PCT/JP2016/001483, dated Jun. 14, 2016, with English translation thereof, pp. 1-10.
"Submission of opinions of Japan Counterpart Application" dated May 1, 2018, with partial English translation thereof, in response to "Notice of reason for revocation" dated Mar. 5, 2018, p. 1-p. 69.
"TSKgel HXL of Tosoh Bioscience" with partial English translation thereof, pp. 1-3, retrieved from "http://www.separations.asia.tosohbioscience.com", as "Exhibit I cited in Submission of opinions of Japan Counterpart Application".
"Shodex" with partial English translation thereof, pp. 1-5, as "Exhibit 2 cited in Submission of opinions of Japan Counterpart Application".
"Request for correction of Japan Counterpart Application" dated May 1, 2018, with partial English translation thereof, p. 1-p. 55.
"Office Action of Japan Counterpart Application," dated Jun. 14, 2016,with partial English translation thereof, p. 1-.p. 4,in which the listed references were cited(Foreign Patent Documents No. 1 and 2).
"Office Action of Japan Counterpart Application," dated May 29, 2017,p. 1-p. 58,in which the listed references were cited(Foreign Patent Documents No. 3, 4, 5 and NPL No. 5).
"Amendment to Office Action of Japan Counterpart Application," dated Aug. 8, 2016,p. 1-p. 2.
"Amendment to Office Action of Japan Counterpart Application," dated Aug. 8, 2016,p. 1-p. 4.
Tosoh Analysis and Research Center Co., Ltd.,"[Technical Data] GPC Method (SEC Method) Introductory Course", retrived from http://www.tosoh-arc.co.jp/techrepo/files/tarc00297/pdf/T1001Y.pdf, with partial English translation thereof, p. 1-p. 7.

(Continued)

Primary Examiner — Victor S Chang
(74) Attorney, Agent, or Firm — JCIPRNET

(57) ABSTRACT

An adhesive includes: a urethane prepolymer (A) obtained by reacting a polyol (a) with a polyisocyanate (b) under such conditions that the molar ratio of NCO/OH is 0.5-0.9 and having a molecular-weight dispersion degree [(weight-average molecular weight (Mw))/(number-average molecular weight (Mn)); hereinafter referred to also as Mw/Mn] of 4-12; a polyfunctional polyol (B), and an isocyanate curing agent (C).

11 Claims, No Drawings

(56) References Cited

OTHER PUBLICATIONS

"Office Action of Japan Counterpart Application," dated Sep. 1, 2016, p. 1-p. 34 in which the listed references were cited(Foreign Patent Documents No. 1, 3-5).
"International Search Report (Form PCT/ISA/210)", dated Jun. 14, 2016, with English translation thereof, pp. 1-4.
Office Action of China Counterpart Application, with English translation thereof, dated Mar. 31, 2020, pp. 1-13.
Office Action of China Counterpart Application, with English translation thereof, dated Apr. 2, 2020, pp. 1-20.
"Office Action of China Counterpart Application", dated May 13, 2020, with English translation thereof, pp. 1-21.

* cited by examiner

ADHESIVE AND ADHESIVE TAPE

CROSS-REFERENCE TO RELATED APPLICATIONS

This application is a Continuation of PCT International Application No. PCT/JP2016/001483, filed on Mar. 15, 2016, which claims priority under 35 U.S.C. § 119(a) to Japanese Patent Application No. 2015-058524, filed on Mar. 20, 2015. Each of the above applications is hereby expressly incorporated by reference, in their entirety, into the present application.

BACKGROUND OF THE INVENTION

1. Field of the Invention

The present disclosure relate to a urethane adhesive.

2. Description of Related Art

In recent years, portable devices such as mobile phones, smart phones, portable game devices, tablet-type PCs, and electronic papers have adopted novel designs in addition to being reduced in size and weight. For this reason, while a conventional display mounted on a mobile device generally has a flat surface, a display with a curved glass cover has been disclosed (see Patent Literature 1). For such, a material able to cope with this new display is required.

Further, an optical part such as a display and the like mounted on a mobile device is easily damaged and dust readily adheres thereto, and thus an adhesive tape is used to temporarily protect a surface during the manufacturing process and before reaching the consumer. Further, since an electronic component such as an IC chip or the like undergoes precision processing, an adhesive tape for protecting components which can temporarily fix battery components on the adhesive tape during transportation in the manufacturing line and pick up electronic components with a light force after the process is complete is required.

Since peeling is a prerequisite for adhesive tape, a low adhesive strength with which damage to the optical parts or the like at the time of peeling is not caused is required. Further, it is also necessary to have a property of not easily contaminating the optical parts when the adhesive tape is peeled off after the manufacturing process. Accordingly, there is demand for an adhesive for use in the formation of an adhesive layer of an adhesive tape which satisfies the above-described requirements.

Further, as an adhesive for use in a surface protective adhesive tape, Patent Literature 2 discloses an acrylic adhesive containing an acrylic polymer obtained by copolymerizing a (meth)acrylic acid alkyl ester having a solubility parameter (SP value) of less than 8.5, a functional group-containing monomer, and the like, an acrylic polymer obtained by copolymerizing a (meth)acrylic acid alkyl ester having a solubility parameter of 8.5 or more, a functional group-containing monomer, and the like, and a crosslinking agent. Further, Patent Literature 3 discloses a urethane adhesive containing a polyurethane-based resin obtained by curing a composition containing a polyol having two or more hydroxyl groups and a polyfunctional aromatic isocyanate compound.

REFERENCE LIST

Patent Literature

[Patent Literature 1]
    Japanese Unexamined Patent Application Publication No. 2013-125118
[Patent Literature 2]
    Japanese Unexamined Patent Application Publication No. 2005-89573
[Patent Literature 3]
    Japanese Unexamined Patent Application Publication No. 2014-28876

SUMMARY OF THE INVENTION

The adhesive of the present disclosure includes a urethane prepolymer (A), a polyfunctional polyol (B) and an isocyanate curing agent (C), and the urethane prepolymer (A) is a polymer having a molecular-weight dispersion degree of 4 to 12 which is obtained by reacting a hydroxyl group of a polyol (a) with an isocyanate group of a polyisocyanate (b) where a molar ratio of NCO/OH is 0.5 to 0.9.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Hereinafter, before explaining the present disclosure in detail, terms used herein will be explained. First, a sheet, a film and a tape are synonyms. A curved part is also called a curved surface portion. A molecular-weight dispersion degree is a value obtained by dividing a weight average molecular weight by a number average molecular weight. NCO/OH is a value obtained by dividing the number of moles of an isocyanate group by the number of moles of a hydroxyl group. A protected member is an opposite part to which the adhesive tape is adhered, and is also called an adherend. Processability refers to blade contamination when an adhesive sheet is cut with a cutter knife, and is also called cuttability.

The adhesive of the present disclosure includes a urethane prepolymer (A), a polyfunctional polyol (B) and an isocyanate curing agent (C), and the urethane prepolymer (A) is a polymer having a molecular-weight dispersion degree of 4 to 12 which is obtained by reacting a hydroxyl group of a polyol (a) with an isocyanate group of a polyisocyanate (b) where a molar ratio of NCO/OH is 0.5 to 0.9.

According to the present disclosure as described above, a urethane prepolymer (A) with a high molecular-weight dispersion degree can be obtained by setting the ratio between the functional groups of the polyol (a) and the polyisocyanate (b) within a predetermined range. Since low molecular weight components contribute to stress relaxation of an entire adhesive layer, the urethane prepolymer (A) has an effect of contributing to improvement of adhesion to a curved surface and improvement of wettability in addition to an effect of improvement of removability in which hardly any adhesive residues occur.

According to the present disclosure, for example, an adhesive which has excellent wettability with respect to a protected member such as glass, adhesion to a curved surface and processability, and can form an adhesive layer of an adhesive tape with which adhesive residues are minimized can be provided.

The adhesive of the present disclosure is preferably used as an adhesive tape having an adhesive layer formed thereon by coating and having a base material. Further, the adhesive tape may be a double-sided adhesive tape having an adhesive layer formed on both sides of a base material (also referred to as a core material).

In the adhesive of the present disclosure, the urethane prepolymer (A) is a polymer having a molecular-weight dispersion degree of 4 to 12 which is obtained by reacting a hydroxyl group of a polyol (a) with an isocyanate group of a polyisocyanate (b) where a molar ratio of NCO/OH is 0.5 to 0.9.

As the polyol (a), a known polyol having at least two or more hydroxyl groups is used. Examples thereof include polyacrylic polyols, polyether polyols, polyester polyols, polycaprolactone polyols, polycarbonate polyols, castor oil-based polyols, and the like. Among these, polyether polyols, polyester polyols, polycaprolactone polyols and polycarbonate polyols are preferred. Further, when two or more polyols are used in combination, a molecular-weight dispersion degree can be easily adjusted.

The polyester polyol may be obtained by a known synthesis method such as an esterification reaction or the like between, for example, an acid component and a glycol component or a polyol component. Examples of the acid component include succinic acid, adipic acid, azelaic acid, sebacic acid, terephthalic acid, phthalic anhydride, isophthalic acid, trimellitic acid, and the like.

Examples of the glycol component include ethylene glycol, propylene glycol, butylene glycol, diethylene glycol, 1,4-butanediol, neopentyl glycol, 1,6-hexane glycol, 3-methyl-1,5-pentanediol, 3,3'-dimethylolheptane, butylethylpentanediol, polyoxyethylene glycol, polyoxypropylene glycol, and the like.

Examples of the polyol component include glycerin, trimethylolpropane, pentaerythritol, and the like.

Any molecular weight may be selected as the molecular weight of the polyester polyol, and a polyester polyol having a number average molecular weight of 500 to 5,000 is preferred. When the number average molecular weight is within the above range, the reactivity during synthesis becomes excellent, and the cohesive force of the urethane prepolymer (A) is further improved.

For example, the polyether polyol may be obtained by a known synthesis method such as a method of polymerizing oxirane compounds such as ethylene oxide, propylene oxide, butylene oxide, tetrahydrofuran or the like using a low molecular weight polyol such as water, ethylene glycol, propylene glycol, glycerin, trimethylolpropane or the like as an initiator. As the polyether polyol thus obtained, for example, polyethylene glycol, polypropylene glycol, polytetramethylene glycol and the like are preferred.

The molecular weight of the polyether polyol may be selected arbitrarily, and the polyether polyol preferably has a number average molecular weight of 1,000 to 5,000.

Further, in the present disclosure, a part of the polyol (a) may be replaced with another compound and these used in combination as necessary. For example, a part of the polyol (a) may be replaced with glycols such as ethylene glycol, 1,4-butanediol, neopentyl glycol, butylethylpentanediol, glycerin, trimethylolpropane, pentaerythritol and the like, and polyvalent amines such as ethylenediamine, N-aminoethylethanolamine, isophoronediamine, xylylenediamine and the like, and these used in combination.

The polyether polyol is preferably a polyol having two hydroxyl groups, and a balance between adhesive strength and removability may be easily obtained by using a polyether polyol having at least three hydroxyl groups in one molecule for a part.

When a polyether polyol having at least three hydroxyl groups in one molecule is used, the number average molecular weight thereof is preferably 1,000 to 5,000, and more preferably 2,000 to 5,000. When the number average molecular weight is within this predetermined range, a reaction rate without excess or deficiency is obtained at the time of synthesizing the urethane prepolymer (A), and the cohesive force is improved.

Examples of polycaprolactone polyols include polyols synthesized by ring-opening polymerization of cyclic ester monomers such as E-caprolactone, u-valerolactone, and the like.

The molecular weight of the polycaprolactone polyol may be arbitrarily selected, and the number average molecular weight is preferably 500 to 5,000. When the number average molecular weight is within the above range, the reactivity during synthesis becomes excellent, and the cohesive force of the urethane prepolymer (A) is further improved.

Examples of the polycarbonate polyol include polycarbonate polyols obtained from a polycondensation reaction of a glycol component with phosgene; polycarbonate polyols obtained from a transesterification condensation of a polyol component with a carbonic acid diester such as dimethyl carbonate, diethyl carbonate, dipropyl carbonate, diisopropyl carbonate, dibutyl carbonate, ethyl butyl carbonate, ethylene carbonate, propylene carbonate, diphenyl carbonate, dibenzyl carbonate and the like; copolymerized polycarbonate polyols obtained by using two or more of the above polyol components in combination; polycarbonate polyols obtained from an esterification reaction of polycarbonate polyols with carboxyl group-containing compounds; polycarbonate polyols obtained from an esterification reaction of polycarbonate polyols with hydroxyl group-containing compounds; polycarbonate polyols obtained from a transesterification reaction of polycarbonate polyols with ester compounds; polyester-based polycarbonate polyols obtained from a polycondensation reaction of various polycarbonate polyols with a dicarboxylic acid compound; copolymerized polyether-based polycarbonate polyols obtained by copolymerizing various polycarbonate polyols with alkylene oxides, and the like.

The molecular weight of the polycarbonate polyol may be arbitrarily selected, and the number average molecular weight is preferably 500 to 5,000. When the number average molecular weight is within the above range, the reactivity during synthesis becomes excellent, and the cohesive force of the urethane prepolymer (A) is further improved.

The polyol (a) may be used alone or two or more thereof may be used in combination, and it is preferable to use two or more polyols (a) in combination. Accordingly, the molecular-weight dispersion degree of the urethane prepolymer (A) can be easily adjusted, and the adjustment of the cohesive force also becomes easy, and thus the adhesive strength and wettability can be further improved. When polyols (a) are used in combination, it is preferable to use two or more of polyether polyols, polyester polyols, polycaprolactone polyols and polycarbonate polyols. Further, when used in combination, the polyester polyols are preferably contained at 10 to 90 mol % in the polyols (a). Similarly, the polyether polyols are preferably contained at 20 to 80 mol % in the polyols (a). Similarly, the polycarbonate polyols are preferably contained at 5 to 50 mol % in the polyols (a). Similarly, the polycaprolactone polyols are preferably contained at 5 to 50 mol % in the polyols (a).

Examples of the polyisocyanate (b) include known compounds such as aromatic polyisocyanates, aliphatic polyisocyanates, araliphatic polyisocyanates, alicyclic polyisocyanates, and the like.

Examples of the aromatic polyisocyanate include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatetoluene, 1,3,5-triisocyanatebenzene, dianisidine diisocyanate, 4,4'-diphenyl ether diisocyanate, 4,4',4"-triphenylmethane triisocyanate, and the like.

Examples of the aliphatic polyisocyanate include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, and the like.

Examples of the araliphatic polyisocyanate include xylylene diisocyanate, ω,ω'-diisocyanate-1,3-dimethylbenzene, ω,ω'-diisocyanate-1,4-dimethylbenzene, ω,ω'-diisocyanate-1,4-diethylbenzene, 1,4-tetramethylxylylene diisocyanate, 1,3-tetramethylxylylene diisocyanate, and the like.

Examples of the alicyclic polyisocyanate include 3-isocyanatomethyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), 1,4-bis(isocyanatomethyl)cyclohexane, 1,4-bis(isocyanatomethyl)cyclohexane, and the like.

Further, as the trifunctional isocyanate, there may be a trimethylolpropane adduct obtained by modifying these polyisocyanates, a biuret obtained by reacting these polyisocyanates with water, and a trimer having an isocyanurate ring obtained by modifying these polyisocyanates, and these may be used in combination.

The polyisocyanate (b) may be used alone or two or more types thereof may be used in combination.

As the polyisocyanate (b), an aliphatic polyisocyanate and an alicyclic polyisocyanate are preferred, and an aliphatic polyisocyanate is more preferred. When these polyisocyanates are used, yellowing of the adhesive layer may be minimized.

In the present disclosure, preferably, the urethane prepolymer (A) is made to have a molecular-weight dispersion degree (Mw/Mn) of 4 to 12, and more preferably has a molecular-weight dispersion degree (Mw/Mn) of 6 to 10, by reacting a polyol (a) with a polyisocyanate (b) where a molar ratio of NCO/OH is 0.5 to 0.9. When the molecular-weight dispersion degree is 4 to 12, the solubility of the urethane prepolymer (A) and the polyol (B) is improved, an adhesive layer with high transparency is easily obtained, adhesion to a curved surface portion is improved, and adhesive residues can be minimized.

The weight average molecular weight of the urethane prepolymer (A) is preferably 300,000 to 5,000,000, and more preferably 500,000 to 4,000,000. When the weight average molecular weight is 300,000 to 5,000,000, coatability is further improved.

The urethane prepolymer (A) may be obtained by successively polymerizing polyols (a) and polyisocyanates (b). In the polymerization reaction, whether or not a catalyst is used is irrelevant. When a catalyst is used, for example, examples thereof include a tertiary amine compound, an organometallic compound, and the like.

The amount of the used catalyst is preferably 0.01 to 1 parts by weight based on 100 parts by weight of the total amount of the polyols (a) and the polyisocyanates (b).

Examples of the tertiary amine compound include triethylamine, triethylenediamine, 1,8-diazabicyclo(5,4,0)-undecene-7 (DBU), and the like.

Examples of the organometallic compound include tin-based compounds, non-tin-based compounds, and the like.

Examples of the tin-based compound include dibutyltin dichloride, dibutyltin oxide, dibutyltin dibromide, dibutyltin dimaleate, dibutyltin dilaurate (DBTDL), dioctyltin dilaurate, dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, tin 2-ethylhexanoate, and the like.

Examples of the non-tin-based compound include titanium-based compounds such as dibutyltitanium dichloride, tetrabutyl titanate, butoxytitanium trichloride and the like; lead-based compounds such as lead oleate, lead 2-ethylhexanoate, lead benzoate, lead naphthenate and the like; iron-based compounds such as iron 2-ethylhexanoate, iron acetylacetonate and the like; cobalt-based compounds such as cobalt benzoate, cobalt 2-ethylhexanoate and the like; zinc-based compounds such as zinc naphthenate, zinc 2-ethylhexanoate and the like; zirconium naphthenate, bismuth carboxylate, and the like.

When the above-described catalysts are used, since the synthesis reaction using two types of the polyol (a) has a difference in reactivity between the two types, when synthesis is performed using a single catalyst alone, problems of gelation and white turbidity of a reaction solution are liable to occur. Therefore, the synthesis reaction using two types of the polyol (a) is preferred, because the reaction rate, the selectivity of the catalyst according to the polyol (a) and the like can be controlled when two or more types of catalyst are used. Examples of the combination of the catalyst include a combination of tertiary amines and organometallic compounds, or a combination of tin-based compounds and non-tin-based compounds, or tin-based compounds and tin-based compounds, and the like. Among these, a combination of tin-based compounds and tin-based compounds is preferred, and a combination of dibutyltin dilaurate and tin 2-ethylhexanoate is more preferred. For the proportion in which dibutyltin dilaurate and tin 2-ethylhexanoate are mixed together, a value obtained by dividing the amount of tin 2-ethylhexanoate mixed in by the amount of dibutyltin dilaurate mixed in, in terms of a weight ratio, is less than 1, and preferably 0.2 to 0.6. When this mixing ratio is less than 1, the polymerization reactivity is improved, and a polymer with a desired molecular weight can be easily obtained.

When a catalyst is used in the synthesis reaction of the polyol (a) and the polyisocyanate (b), the temperature is preferably less than 100° C., and more preferably 85 to 95° C. When polymerization is performed at a temperature of less than 100° C., the reaction rate and molecular structure can be easily controlled, and a urethane prepolymer (A) having a predetermined molecular weight can be easily obtained.

The synthesis of the urethane prepolymer may be performed without a catalyst. In this case, the reaction temperature is preferably set as 100° C. or more, and more preferably set as 110° C. or more.

The synthesis of the urethane prepolymer (A) is preferably carried out by a method (1) of adding all of the polyol (a) and the polyisocyanate (b) into a flask, or a method (2) of adding the polyol (a) into a flask and adding the polyisocyanate (b) dropwise thereto. When the method (2) is used, the reaction can be easily controlled.

As a solvent for synthesizing the urethane prepolymer (A), a known organic solvent may be used. Examples thereof include acetone, methyl ethyl ketone, ethyl acetate, toluene, xylene, and the like. Among these, toluene is preferred from the viewpoint of solubility of the urethane prepolymer (A) and coatability.

As the organic solvent, the same organic solvent as the diluent solvent to be described later may be used. The organic solvent may be used alone or two or more types thereof may be used in combination.

The polyfunctional polyol (B) reacts with the isocyanate curing agent (C) in addition to the urethane prepolymer (A) to form a segment with high crosslinking density in the crosslinked structure of the adhesive layer. Since the segment with high crosslinking density improves the stress relaxation of the adhesive layer due to a synergistic effect with the urethane prepolymer (A), the segment with high crosslinking density adheres closely to the adherend to increase adhesive strength, and reconciles the improvement of the removability with the improvement of adhesion on a curved surface to a high degree.

As the polyfunctional polyol (B), the previously described polyols (a) may be used. The introduction of the polyfunctional polyol (B) into the adhesive is preferably performed as a separate addition. Further, the unreacted polyol (a) remaining in the synthesis of the urethane prepolymer (A) may be a polyfunctional polyol (B).

The polyfunctional polyol (B) is preferably a polyol (a) having three or more hydroxyl groups.

The polyfunctional polyol (B) is preferably included at 2 to 30 parts by weight, more preferably 4 to 20 parts by weight based on 100 parts by weight of the urethane prepolymer (A). When the polyfunctional polyol (B) is included at 2 to 30 parts by weight, the proportion of the segment with high crosslinking density in the crosslinked structure can be suitably adjusted, and thus the adhesive strength and the transparency of the adhesive layer are further improved.

In the present disclosure, as the isocyanate curing agent (C), the previously described polyisocyanates (b) may be used. Among these polyisocyanates (b), trifunctional isocyanates are more preferred.

The isocyanate curing agent (C) is preferably mixed in an amount of 3 to 30 parts by weight, and more preferably 10 to 20 parts by weight based on 100 parts by weight of the urethane prepolymer (A). When the isocyanate curing agent (C) is mixed in an amount of 3 to 30 parts by weight, a cohesive force of the adhesive layer is improved and adhesive strength is also further improved.

The adhesive of the present disclosure may further include a fatty acid ester (D). The fatty acid ester (D) improves the removability and wettability of the adhesive. The fatty acid ester (D) is preferably an ester formed of an acid having 4 to 18 carbon atoms and an alcohol having 20 or less carbon atoms. Further, an ester (1) formed of a monobasic acid having 8 to 18 carbon atoms and a branched alcohol having 18 or less carbon atoms, an ester (2) formed of an unsaturated fatty acid or a branched acid having 14 to 18 carbon atoms and a tetravalent or less alcohol, and an ester (3) formed of a monobasic acid having 4 to 13 carbon atoms and a diol having 20 or less carbon atoms are more preferred.

Examples of the ester (1) formed of a monobasic acid having 8 to 18 carbon atoms and a branched alcohol having 18 or less carbon atoms include isostearyl laurate, isopropyl myristate, isocetyl myristate, octyldodecyl myristate, isostearyl palmitate, isocetyl stearate, octyldodecyl oleate, diisostearyl adipate, diisocetyl sebacate, trioleyl trimellitate, triisocetyl trimellitate and the like, and isopropyl myristate, isocetyl myristate, octyldodecyl myristate and the like are preferred. Among these, isopropyl myristate is preferred.

Example of an unsaturated fatty acid or a branched acid having 14 to 18 carbon atoms used in the ester (2) formed of an unsaturated fatty acid or a branched acid having 14 to 18 carbon atoms and a tetravalent or less alcohol include myristoleic acid, oleic acid, linoleic acid, linolenic acid, isopalmitic acid or isostearic acid, and the like.

Further, examples of the tetravalent or less alcohol include ethylene glycol, propylene glycol, glycerin, trimethylolpropane, pentaerythritol, sorbitan, and the like.

Example of the ester (3) formed of a monobasic acid having 4 to 13 carbon atoms and a diol having 20 or less carbon atoms include polyethylene glycol dibutylate, polyethylene glycol dihexanoate, polyethylene glycol di-2-ethylhexylate, butyric acid/tridecylic acid polyethylene glycol and the like. Among these, polyethylene glycol di-2-ethylhexylate is preferred.

The fatty acid ester (D) preferably has a molecular weight (formula weight) of 200 to 700. When the molecular weight is within this range, compatibility with the urethane prepolymer (A) is improved, and thus transparency and a cohesive force are increased. Accordingly, removability is improved and the adherend is less likely to be contaminated.

The fatty acid ester (D) is preferably included at 5 to 50 parts by weight, and more preferably 10 to 30 parts by weight with respect to 100 parts by weight of the urethane prepolymer. When the amount of the fatty acid ester (D) is within this range, the cohesive force and removability are further improved.

In the crosslinking reaction using the isocyanate curing agent (C), a curing accelerator and a curing retardant may be used.

As the curing accelerator, the catalysts already described for the urethane prepolymer (A) may be used. The curing accelerator may be used alone or two or more thereof may be used in combination.

The curing accelerator is preferably used in an amount of 0.0005 to 0.1 parts by weight, more preferably 0.001 to 0.05 parts by weight, further preferably 0.003 to 0.03 parts by weight, and most preferably 0.005 to 0.01 parts by weight based on 100 parts by weight of the total amount of the urethane prepolymer (A) and the polyfunctional polyol (B).

The curing retardant associates with the isocyanate group and masks an isocyanate group to extend the pot life of the adhesive after being mixed with the isocyanate curing agent (C), and the curing retardant dissociates at the drying temperature during coating to restore an isocyanate group.

Examples of the curing retarder include methyl ethyl ketone, methyl isobutyl ketone, cetyl acetone, acetone acetic acid ester, malonic acid ester, and the like.

The curing retarder is preferably used in an amount of 0.005 to 1 parts by weight, more preferably 0.01 to 0.7 parts by weight, further preferably 0.03 to 0.3 parts by weight, and most preferably, 0.05 to 0.1 parts by weight based on 100 parts by weight of the total amount of the urethane prepolymer (A) and the polyfunctional polyol (B).

The adhesive of the present disclosure may further contain an antioxidant. The antioxidant is preferably a radical chain inhibitor (primary antioxidant) or a peroxide decomposer (secondary antioxidant). When an antioxidant is contained, retaining strength at a high temperature is further improved.

Examples of the radical chain inhibitor include phenolic compounds, amine compounds, and the like. Further, examples of the peroxide decomposing agent include a sulfur-based compound, a phosphorus-based compound, and the like.

Examples of the phenolic compound include a monophenol-based compound, a bisphenol-based compound, and a polymer type phenol-based compound.

Examples of the monophenol-based compound include 2,6-di-t-butyl-p-cresol, butylated hydroxyanisole, 2,6-di-t-butyl-4-ethylphenol, stearin-β-(3,5-di-t-butyl-4-hydroxyphenyl)propionate, and the like.

Examples of the bisphenol-based compound include 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis(3-methyl-6-t-butylphenol), 3,9-bis[1,1-dimethyl-2-[3-(3-t-butyl-4-hydroxy-5-methylphenyl)propionyloxy]ethyl]2,4, 8,10-tetraoxaspiro[5,5]undecane, and the like.

Examples of the polymer type phenol-based compound (monophenol-based compound) include 1,3,3-tris(2-methyl-4-hydroxy-5-t-butylphenyl)butane, 1,3,5-trimethyl-2,4,6-tris(3,5-di-t-4-hydroxybenzyl)benzene, tetrakis-[methylene-3-(3',5'-di-t-butyl-4'-hydroxyphenyl)propionate]methane, bis[3,3'-bis-(4'-butylphenyl)butyric acid]glycol ester, 1,3,5-tris(3',5'-di-t-butyl-4'-hydroxybenzyl)-s-triazine-2,4,6-(1H, 3H,5H)trione, tocopherol, and the like. In commercial products, IRGANOX L135 (manufactured by BASF) is preferred due to having excellent compatibility with a resin.

Examples of the sulfur-based compound include dilauryl 3,3'-thiodipropionate, dimyristyl 3,3'-thiodipropionate, distearyl 3,3'-thiodipropionate, and the like.

Examples of the phosphorus compound include triphenyl phosphite, diphenyl isodecyl phosphite, phenyl diisodecyl phosphite, and the like.

The adhesive of the present disclosure may further contain a light stabilizer. A known compound may be used as the light stabilizer, but in particular, a hindered amine-based compound is preferred.

A known organic solvent may be used as a diluting solvent which may be used for the pressure sensitive adhesive of the present disclosure. Examples thereof include acetone, methyl ethyl ketone, ethyl acetate, toluene, xylene, and the like.

The diluting solvent may be used alone or two or more thereof maybe used in combination.

Fillers such as talc, calcium carbonate, titanium oxide and the like, additives such as colorants, ultraviolet absorbers, defoaming agents, light stabilizers and the like may be mixed into the adhesive of the present disclosure, as necessary.

In the adhesive of the present disclosure, in an elution curve of weight average molecular weight obtained by measuring the adhesive by gel permeation chromatography (GPC), a high molecular weight side and a low molecular weight side partitioned at a weight average molecular weight of 10,000 as a boundary each have one peak. When the elution curve of the adhesive has these peaks, cuttability and curved surface fitness can be easily reconciled. Further, the above description does not bar the presence of two or more peaks on the high molecular weight side and the low molecular weight side, respectively.

In the adhesive of the present disclosure, in an elution curve of weight average molecular weight obtained by measuring the adhesive by gel permeation chromatography (GPC), proportions of a high molecular weight component and a low molecular weight component in an entire molecular weight distribution are such that an area of the high molecular weight component is preferably 70 to 98%, and an area of the low molecular weight component is preferably 2 to 30%, and more preferably, an area of the high molecular weight component is preferably 80 to 96%, and an area of the low molecular weight component is preferably 4 to 20%. When the area ratio between the high molecular weight component and the low molecular weight component in the weight average molecular weight distribution is within an appropriate range, cuttability and curved surface fitness can be easily reconciled. Further, as a typical range of the high molecular weight component (high molecular weight side), the weight average molecular weight is 10,000 to 2,000,000. Further, as a typical range of the low molecular weight component (low molecular weight side), the weight average molecular weight is 1000 to 10,000.

As a method of preparing an adhesive containing the high molecular weight component and the low molecular weight component as described above, known methods such as a method of mixing two types of the urethane prepolymer (A), a method of mixing the urethane prepolymer (A) as a high molecular weight component and the polyfunctional polyol (B) as a low molecular weight component, a method of synthesizing the urethane prepolymer (A) in two steps, and the like may be used. Further, a urethane prepolymer (A) having a weight average molecular weight of 10,000 or less may be regarded as the polyfunctional polyol (B).

The adhesive sheet of the present disclosure preferably includes a base material and an adhesive layer formed from an adhesive. The adhesive layer may be formed by coating an adhesive. Examples of the base material include plastics, paper, metal foil, and the like. The form of the base material may be a sheet, a film, a foam, and the like. Further, adhesion to the adhesive layer may be improved by subjecting the surface of the base material to an easy adhesion treatment. The easy adhesion treatment preferably includes a wet treatment of applying an anchor coating agent and a drying treatment of performing corona discharge, and may be suitably selected.

The coating of the adhesive is generally preformed by a method of coating a releasable sheet with an adhesive to form an adhesive layer and adhering the adhesive layer to a base material, and a method of coating a base material with an adhesive to form an adhesive layer and adhering the adhesive layer to a releasable sheet.

Examples of the method of coating an adhesive include known methods such as a roll coater method, a comma coater method, a die coater method, a reverse coater method, a silk screen method, a gravure coater method, and the like. It is preferable to dry during coating. For drying, a known drying apparatus such as a hot air oven, an infrared heater or the like may be used.

The thickness of the adhesive layer may be suitably adjusted, and is usually about 0.1 to 200 μm.

The adhesive tape of the present disclosure may be preferably used for surface protection applications during production and transportation of vulnerable objects such as displays and glass and for transportation applications during manufacture of electronic components, and may be widely used for general applications as an adhesive tape.

EXAMPLES

Hereinafter, the present disclosure will be specifically described with reference to examples, but the present disclosure is not limited to the examples. In the examples, "parts" refers to "parts by weight" and "%" refers to "wt %".

Raw materials used in synthesis examples are shown below.

<Polyol (a)>

(a-1): Kuraray Polyol P-1010 (polyester polyol, number average molecular weight (Mn) 1000, two hydroxyl groups, manufactured by Kuraray Co.)

(a-2): Kuraray Polyol P-2010 (polyester polyol, number average molecular weight (Mn) 2000, two hydroxyl groups, manufactured by Kuraray Co.)

(a-3): Kuraray Polyol P-3010 (polyester polyol, number average molecular weight (Mn) 3000, two hydroxyl groups, manufactured by Kuraray Co.)

(a-4): SANNIX PP-2000 (polyether polyol, number average molecular weight (Mn) 2000, two hydroxyl groups, manufactured by Sanyo Chemical Industries, Ltd.)

(a-5): SUNNYX GP-1500 (polyether polyol, number average molecular weight (Mn) 1500, three hydroxyl groups, manufactured by Sanyo Chemical Industries, Ltd.)

(a-6): SUNNYX GP-3000 (polyether polyol, number average molecular weight (Mn) 3000, three hydroxyl groups, manufactured by Sanyo Chemical Industries, Ltd.)

(a-7): PLACCEL 220N (polycaprolactone polyol, number average molecular weight (Mn) 2000, two hydroxyl groups, manufactured by Daicel Chemical Industries, Ltd.)

(a-8): Desmophen 2020E (polycarbonate polyol, number average molecular weight (Mn) 2000, two hydroxyl groups, manufactured by Sumika Bayer Urethane Co.)

<Polyisocyanate (b)>

(b-1): Hexamethylene diisocyanate (manufactured by Tosoh Corporation)

(b-2): Takenate 500 (xylylene diisocyanate, manufactured by Mitsui Chemical Co., Ltd.)

Synthesis Example 1

In a four-necked flask equipped with a stirrer, a reflux condenser, a nitrogen inlet tube, a thermometer and a dropping funnel, 50 parts by weight of polyester polyol (a-1), 850 parts by weight of polyether polyol (a-5), and hexamethylene diisocyanate were added such that NCO/OH was 0.5, 650 parts by weight of toluene, 0.1 parts by weight of dibutyltin dilaurate as a catalyst, and 0.25 parts by weight of tin 2-ethylhexanoate were added, and the temperature was gradually raised to 90° C. to perform a reaction for 2 hours. The reaction was terminated by cooling after confirming the disappearance of residual isocyanate groups by IR, and thereby a urethane prepolymer solution was obtained. The urethane prepolymer solution thus obtained had a nonvolatile content of 60%, weight average molecular weight (Mw) 61,000, and a molecular weight dispersion degree of 6.

Synthesis Examples 2 to 16

Each of a urethane prepolymer of Synthesis Examples 2 to 16 was obtained in the same manner as in Synthesis Example 1 except for replacing the types and amounts of the raw materials with those listed in Table 1.

<Measurement of Molecular Weight>

A weight average molecular weight (Mw), a number average molecular weight (Mn), a molecular-weight dispersion degree (Mw/Mn), the number of peaks of a high molecular weight side and a low molecular weight side partitioned by a weight average molecular weight of 10,000 as a boundary, and the ratio (%) of the high molecular weight component to the low molecular weight component were numerical values in terms of polystyrene determined by gel permeation chromatography (GPC) measurement, and the measurement conditions were as follows.

A GPC (SCL-6B, manufactured by Shimadzu Corporation) was used, the temperature of columns (KF-805L, KF-803L and KF-802 manufactured by Showa Denko KK, connected in series) was set to 40° C., tetrahydrofuran was used as an eluent, a flow rate was 0.2 ml/min, RI detection was set, a sample concentration was set to 0.02%, and polystyrene was used for standard samples when perfo g easurement.

TABLE 1

| | Mn | Synthesis Example 1 | Synthesis Example 2 | Synthesis Example 3 | Synthesis Example 4 | Synthesis Example 5 | Synthesis Example 6 | Synthesis Example 7 | Synthesis Example 8 |
|---|---|---|---|---|---|---|---|---|---|
| Polyester polyol (a-1) | 1000 | 50 | | | | | | | |
| Polyester polyol (a-2) | 2000 | | 200 | | | | | 300 | 300 |
| Polyester polyol (a-3) | 3000 | | | 300 | | | | | |
| Polyether polyol (a-4) | 2000 | | | | | | 700 | | |
| Polyether polyol (a-5) | 1500 | | | | | | | | 600 |
| Polyether polyol (a-6) | 3000 | 850 | 700 | 600 | 400 | 300 | 200 | 600 | |
| Polycaprolactone polyol (a-7) | 2000 | | | | | 600 | | | |
| Polycarbonate polyol (a-8) | 2000 | | | | 500 | | | | |
| Hexamethylene diisocyanate (b-1) | NCO/OH ratio | 0.5 | 0.6 | 0.7 | 0.7 | 0.8 | 0.9 | 0.7 | 0.7 |
| Xylylene diisocyanate (b-2) | NCO/OH ratio | | | | | | | | |
| Molecular weight dispersion degree | | 6 | 6 | 6 | 6 | 6 | 6 | 4 | 6 |
| Weight average molecular weight (×1000) | | 61 | 96 | 140 | 156 | 138 | 216 | 171 | 155 |
| Nonvolatile content (%) | | 60 | 60 | 60 | 60 | 60 | 60 | 60 | 60 |

| | Mn | Synthesis Example 9 | Synthesis Example 10 | Synthesis Example 11 | Synthesis Example 12 | Synthesis Example 13 | Synthesis Example 14 | Synthesis Example 15 | Synthesis Example 16 |
|---|---|---|---|---|---|---|---|---|---|
| Polyester polyol (a-1) | 1000 | | | | 300 | 300 | 300 | 300 | 300 |
| Polyester polyol (a-2) | 2000 | 300 | 300 | 300 | | | | | |
| Polyester polyol (a-3) | 3000 | | | | | | | | |
| Polyether polyol (a-4) | 2000 | | | | | | | | |

TABLE 1-continued

| | | | | | | | | | |
|---|---|---|---|---|---|---|---|---|---|
| Polyether polyol (a-5) | 1500 | | 600 | | | | | | |
| Polyether polyol (a-6) | 3000 | 600 | | 600 | 600 | 600 | 600 | 600 | 600 |
| Polycaprolactone polyol (a-7) | 2000 | | | | | | | | |
| Polycarbonate polyol (a-8) | 2000 | | | | | | | | |
| Hexamethylene diisocyanate (b-1) | NCO/OH ratio | 0.7 | 0.7 | | 0.4 | 0.95 | 0.7 | 0.7 | 0.7 |
| Xylylene diisocyanate (b-2) | NCO/OH ratio | | | 0.7 | | | | | |
| Molecular weight dispersion degree | | 8 | 10 | 12 | 6 | 6 | 1.5 | 3 | 15 |
| Weight average molecular weight (×1000) | | 219 | 186 | 251 | 49 | 382 | 84 | 132 | 366 |
| Nonvolatile content (%) | | 60 | 60 | 60 | 60 | 60 | 60 | 60 | 60 |

*Units of the amounts mixed in are parts by weight.

In examples, the following raw materials were used.
<Polyol (B)>

(B-1): Adeka polyether G700 (polyether polyol, number average molecular weight (Mn) 700, three functional groups, manufactured by ADEKA Corporation)

(B-2): Adeka polyether G1500 (polyether polyol, number average molecular weight (Mn) 1500, three functional groups, manufactured by ADEKA Corporation)

(B-3): Adeka polyether G3000B (polyether polyol, number average molecular weight (Mn) 3000, three functional groups, manufactured by ADEKA Corporation)

(B-4): Adeka polyether AM502 (polyether polyol, number average molecular weight (Mn) 5000, three functional groups, manufactured by ADEKA Corporation)

(B-5): Adeka polyether AM702 (polyether polyol, number average molecular weight (Mn) 7000, three functional groups, manufactured by ADEKA Corporation)

<Isocyanate Curing Agent (C)>

(C-1): Coronate HL (trimethylolpropane adducts of hexamethylene diisocyanate, a nonvolatile content of 75%, manufactured by Tosoh Corporation)

(C-2): Sumidur N-3300 (isocyanurate of hexamethylene diisocyanate, a nonvolatile content of 100%, manufactured by Sumika Bayer Urethane Co.)

<Fatty acid ester (D)>

(D-1): Isopropyl palmitate
(D-2): Isopropyl myristate
(D-3): Methyl oleate

Example 1

100 parts by weight of the urethane prepolymer solution of Synthesis Example 1, 2 parts by weight of the multifunctional polyol (B-1), 8.0 parts by weight of the isocyanate curing agent (C-1), 20.0 parts by weight of the fatty acid ester (D-1), 0.3 parts by weight of a polymeric phenolic antioxidant IRGANOX L 135 (manufactured by BASF Co.), 0.3 parts by weight of a benzotriazole-based ultraviolet absorber TINUVIN 571 (manufactured by BASF Co.), 0.3 parts by weight of a hindered amine light stabilizer TINUVIN 765 (manufactured by BASF Co.), and ethyl acetate as a solvent were mixed in appropriate amounts and stirred with a Disper to obtain an adhesive. The adhesive thus obtained was applied to polyethylene terephthalate (Lumirror T-60, manufactured by Toray Industries, Inc.) having a thickness of 50 μm as a base material so as to have a thickness after drying of 20 μm, followed by drying at 100° C. for 2 minutes. A release liner (silicone release layer) having a thickness of 38 μm was laminated thereon. Subsequently, the laminate was left at room temperature for a week to obtain an adhesive tape.

Examples 2 to 11 and Comparative Examples 1 to 7

Each of an adhesive tape of Synthesis Examples 2 to 13 and Comparative Examples 1 to 5 was obtained in the same manner as in Example 1 except for replacing the types and amounts of the raw materials with those listed in Table 1.

Comparative Example 8

80 parts by weight of PREMINOL 53011 (polyether polyol, number average molecular weight (Mn) 10,000, three functional groups, manufactured by Asahi Glass Co., Ltd.), 20 parts by weight of SANNIX GP-1500, 25 parts by weight of Sumidur N-3300, 0.04 parts by weight of Narsem II iron (manufactured by Nippon Chemical Industrial Co., Ltd.) as a catalyst and 266 parts by weight of ethyl acetate (diluting solvent) were mixed and stirred with a Disper to obtain an adhesive. The obtained adhesive was applied as a base material to polyethylene terephthalate having a thickness of 50 μm such that the thickness of the adhesive layer after drying was 20 μm, and dried under conditions of a temperature of 130° C. for 2 minutes, and a release liner having a thickness of 38 μm was bonded to the adhesive layer afterwards. Subsequently, the layers were left at room temperature for 1 week to obtain an adhesive tape.

The adhesive tape obtained was evaluated according to the following items.

<Curved Surface Fitness>

The obtained adhesive tape was prepared to have a size of 25 mm in width and 100 mm in length, and used as a measurement sample. Subsequently, the release liner was peeled off in an atmosphere of 23° C. and 50% RH, and the exposed adhesive layer was laminated along the circumference of a polypropylene cylinder (diameter of 15 mm), such that an adhesive tape sample with the exposed adhesive layer, which had a width of 10 mm corresponding to the length of a half circumference of the circumference was bonded along the circumference of a polypropylene cylinder (diameter: 15 mm), and the lifting state of the measurement sample was observed after 3 days. The evaluation criteria were as follows.

A: There was no lifting, and a measurement sample was in close contact. Good

B: There was lifting of less than 1 mm, and an end portion was slightly lifted. Practical use possible.

C: There was lifting of more than 1 mm. Practical use not possible.

<Adhesive Force>

The obtained adhesive tape was prepared to have a size of 25 mm in width and 100 mm in length and used as a measurement sample. Subsequently, the release liner was peeled off in an atmosphere of 23° C. and 50% RH, the exposed adhesive layer was adhered to a glass plate and pressured with a 2 kg-roll, and then left to stand for 24 hours. Thereafter, the adhesive strength was measured with a tensile tester under conditions of a peel rate of 300 mm/min and a peel angle of 180° in accordance with JISZ 0237. The evaluation criteria were as follows.

A: Less than 50 mN/25 mm. Good.
B: 50 mN/25 mm or more, less than 200 mN/25 mm. Practical use possible.
C: 200 mN/25 mm or more. Practical use not possible.

<Removability>

The obtained adhesive tape was prepared to have a width of 25 mm and a length of 100 mm and used as a measurement sample. Subsequently, the release liner was peeled off in an atmosphere of 23° C. and 50% RH, the exposed adhesive layer was adhered to a glass plate and pressured with a 2 kg-roll, and then left to stand in an environment of 150° C. for 24 hours. Thereafter, it was air-cooled in an atmosphere at 23° C. and 50% RH for 30 minutes, and the adhesive strength was measured under the conditions of a peeling rate of 300 mm/min and a peeling angle of 180° using a tensile tester according to JIS Z 0237. The evaluation criteria were as follows.

A: Less than 100 mN/25 mm. Good.
B: 100 mN/25 mm or more and less than 400 mN/25 mm. Practical use possible.
C: 400 mN/25 mm or more. Practical use not possible.

<Wettability>

The obtained adhesive tape was prepared to have a size of 50 mm in width and 100 mm in length and used as a measurement sample. Subsequently, after standing in an atmosphere of 23° C. and 50% RH for 30 minutes, the release liner was peeled off from the measurement sample, the central portion of the exposed adhesive layer was brought into contact with a glass plate while holding both ends of the adhesive tape with the hands, and then the hands were released therefrom. The adhesion of the adhesive tape to the glass was evaluated by measuring the time until an entire adhesive layer was adhered to the glass plate due to the weight of the adhesive tape. The shorter the time until the entire adhesive layer is adhered to the glass, the better the affinity for the glass is, and thus it is easy to protect the glass in the manufacturing process using the glass material. The evaluation criteria were as follows.

A: Less than 3 seconds until close contact. Good.
B: 3 seconds or more and less than 5 seconds until close contact. Practical use possible.
C: 5 seconds or more until close contact. Practical use not possible.

<Cuttability>

When the surface of the adhesive layer of the obtained adhesive tape was scratched with a blade of a cutter knife and rubbed with a finger, cuttability was evaluated by visually judging whether or not aggregates peeling off from the adhesive layer were generated. Visual inspection was performed under fluorescent light. When the cohesive force of the adhesive layer was excellent, aggregates were not generated. Evaluation was carried out according to the following criteria. Further, whether workability is excellent or poor can be judged by cuttability.

A: Aggregates were generated. Good.
C: No aggregates were generated. Practical use not possible.

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Synthesis Example 1 | 100 | | | | | | | | | |
| Synthesis Example 2 | | 100 | | | | | | | | |
| Synthesis Example 3 | | | 100 | | | | | | | |
| Synthesis Example 4 | | | | 100 | | | | | | |
| Synthesis Example 5 | | | | | 100 | | | | | |
| Synthesis Example 6 | | | | | | 100 | | | | |
| Synthesis Example 7 | | | | | | | 100 | | | |
| Synthesis Example 8 | | | | | | | | 100 | | |
| Synthesis Example 9 | | | | | | | | | 100 | |
| Synthesis Example 10 | | | | | | | | | | 100 |
| Synthesis Example 11 | | | | | | | | | | |
| Synthesis Example 12 | | | | | | | | | | |
| Synthesis Example 13 | | | | | | | | | | |
| Synthesis Example 14 | | | | | | | | | | |
| Synthesis Example 15 | | | | | | | | | | |
| Synthesis Example 16 | | | | | | | | | | |
| Polyol (B-1) | | | | | | | | | | |
| Polyol (B-2) | 2 | 4 | 8 | | | | | | | 2 |
| Polyol (B-3) | | | | 2 | 4 | 8 | | | | 2 |
| Polyol (B-4) | | | | | | | 2 | 4 | 8 | |
| Polyol (B-5) | | | | | | | | | | |
| PREMINOL S3011 | | | | | | | | | | |
| SANNIX GP-1500 | | | | | | | | | | |
| Isocyanate curing agent (C-1) | 15 | 15 | 15 | | | | 15 | 15 | 15 | 15 |
| Isocyanate curing agent (C-2) | | | | 15 | 15 | 15 | | | | |
| IRGANOX L135 | 0.3 | 0.3 | 0.3 | 0.3 | 0.3 | 0.3 | 0.3 | 0.3 | 0.3 | 0.3 |
| TINUVIN 571 | 0.3 | 0.3 | 0.3 | 0.3 | 0.3 | 0.3 | 0.3 | 0.3 | 0.3 | 0.3 |
| TINUVIN 765 | 0.3 | 0.3 | 0.3 | 0.3 | 0.3 | 0.3 | 0.3 | 0.3 | 0.3 | 0.3 |
| Fatty acid ester (D-1) | 25.0 | | | 30.0 | | | 35.0 | | | 20.0 |
| Fatty acid ester (D-2) | | 25.0 | | | 30.0 | | | 35.0 | | |
| Fatty acid ester (D-3) | | | 25.0 | | | 30.0 | | | 35.0 | |

TABLE 2-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Number of peaks High-molecular weight side/ Low-molecular weight side | 1/1 | 1/1 | 1/1 | 1/1 | 1/1 | 1/1 | 1/1 | 1/1 | 1/1 | 1/2 |
| Ratio of high-molecular component/ Low-molecular component | 98/2 | 96/4 | 93/7 | 98/2 | 96/4 | 93/7 | 98/2 | 96/4 | 93/7 | 96/4 |
| Results of physical properties |  |  |  |  |  |  |  |  |  |  |
| Curved surface fitness | B | A | A | B | A | A | B | A | A | A |
| Adhesive force | A | A | A | A | A | A | A | A | A | B |
| Removability | A | A | A | A | A | A | A | A | A | B |
| Wettability | A | A | B | A | A | B | A | A | B | B |
| Cuttability | A | A | A | A | A | A | A | A | A | A |

*Units of the amounts mixed in are parts by weight.

TABLE 3

|  | Example 11 | Comparative Example 1 | Comparative Example 2 | Comparative Example 3 | Comparative Example 4 | Comparative Example 5 | Comparative Example 6 | Example 12 | Example 13 |
|---|---|---|---|---|---|---|---|---|---|
| Synthesis Example 1 |  |  |  |  |  |  |  | 100 |  |
| Synthesis Example 2 |  |  |  |  |  |  |  |  | 100 |
| Synthesis Example 3 |  |  |  |  |  |  |  |  |  |
| Synthesis Example 4 |  |  |  |  |  |  |  |  |  |
| Synthesis Example 5 |  |  |  |  |  |  |  |  |  |
| Synthesis Example 6 |  |  |  |  |  |  |  |  |  |
| Synthesis Example 7 |  |  |  |  |  |  |  |  |  |
| Synthesis Example 8 |  |  |  |  |  |  |  |  |  |
| Synthesis Example 9 |  |  |  |  |  |  |  |  |  |
| Synthesis Example 10 |  |  |  |  |  |  |  |  |  |
| Synthesis Example 11 | 100 |  |  |  |  |  |  |  |  |
| Synthesis Example 12 |  | 100 |  |  |  |  |  |  |  |
| Synthesis Example 13 |  |  | 100 |  |  |  |  |  |  |
| Synthesis Example 14 |  |  |  | 100 |  |  |  |  |  |
| Synthesis Example 15 |  |  |  |  | 100 |  |  |  |  |
| Synthesis Example 16 |  |  |  |  |  | 100 |  |  |  |
| Polyol (B-1) |  |  |  |  |  |  |  |  | 4 |
| Polyol (B-2) | 2 |  |  |  |  |  |  |  |  |
| Polyol (B-3) |  | 4 | 4 | 4 | 4 | 4 |  |  |  |
| Polyol (B-4) | 2 |  |  |  |  |  |  |  |  |
| Polyol (B-5) |  |  |  |  |  |  |  | 4 |  |
| PREMINOL S3011 |  |  |  |  |  |  | 80 |  |  |
| SANNIX GP-1500 |  |  |  |  |  |  | 20 |  |  |
| Isocyanate curing agent (C-1) | 15 | 15 | 15 |  | 15 | 15 |  | 15 | 15 |
| Isocyanate curing agent (C-2) |  |  |  | 15 |  |  | 25 |  |  |
| IRGANOX L135 | 0.3 | 0.3 | 0.3 | 0.3 | 0.3 | 0.3 | 0.3 | 0.3 | 0.3 |
| TINUVIN 571 | 0.3 | 0.3 | 0.3 | 0.3 | 0.3 | 0.3 | 0.3 | 0.3 | 0.3 |
| TINUVIN 765 | 0.3 | 0.3 | 0.3 | 0.3 | 0.3 | 0.3 | 0.3 | 0.3 | 0.3 |
| Fatty acid ester (D-1) |  | 25.0 |  |  |  | 25.0 |  |  |  |
| Fatty acid ester (D-2) | 20.0 |  | 25.0 |  |  | 25.0 |  |  |  |
| Fatty acid ester (D-3) |  | 20.0 |  | 25.0 |  |  |  |  | 25.0 |
| Number of peaks High-molecular weight side/ Low-molecular weight side | 1/2 | 1/1 | 1/1 | 1/1 | 1/1 | 1/1 | 0/2 | 1/1 | 1/1 |

TABLE 3-continued

|  | Example 11 | Comparative Example 1 | Comparative Example 2 | Comparative Example 3 | Comparative Example 4 | Comparative Example 5 | Comparative Example 6 | Example 12 | Example 13 |
|---|---|---|---|---|---|---|---|---|---|
| Ratio of high-molecular component/Low-molecular component | 96/4 | 96/4 | 96/4 | 96/4 | 96/4 | 96/4 | 0/100 | 96/4 | 96/4 |
| Results of physical properties | | | | | | | | | |
| Curved surface fitness | A | C | C | C | C | C | C | B | B |
| Adhesive force | B | B | A | A | A | A | B | A | A |
| Removability | B | B | A | A | A | A | B | A | A |
| Wettability | B | B | B | B | B | C | B | B | B |
| Cuttability | A | C | A | C | C | C | A | B | B |

What is claimed is:

1. An adhesive, comprising:
   a urethane prepolymer (A) which is a polymer having a molecular-weight dispersion degree of 4 to 12 obtained by reacting a hydroxyl group of a polyol (a) with an isocyanate group of a polyisocyanate (b) where a molar ratio of NCO/OH is 0.5 to 0.9, wherein the polyol (a) comprises a polyether polyol having at least three hydroxyl groups in one molecule;
   a polyfunctional polyol (B), wherein the polyfunctional polyol (B) comprises a polyether polyol having three or more hydroxyl groups, and the polyfunctional polyol (B) has a number average molecular weight of 1,000 to 5,000; and
   an isocyanate curing agent (C).

2. The adhesive according to claim 1, further comprising a fatty acid ester (D).

3. The adhesive according to claim 1, wherein the polyol (a) further comprises one or more selected from the group consisting of a polyether polyol having two hydroxyl groups in one molecule, a polyester polyol, a polycarbonate polyol and a polycaprolactone polyol.

4. The adhesive according to claim 1, wherein the polyisocyanate (b) is an aliphatic polyisocyanate.

5. The adhesive according to claim 1, wherein the polyol (a) comprises two or more polyols.

6. The adhesive according to claim 2, wherein the fatty acid ester (D) has a molecular weight of 200 or more.

7. The adhesive according to claim 1, further comprising one or more of a curing accelerator and a curing retarder.

8. The adhesive according to claim 1, further comprising an antioxidant.

9. The adhesive according to claim 1, wherein, in an elution curve of a weight average molecular weight obtained by measuring the adhesive by gel permeation chromatography (GPC), a high molecular weight side and a low molecular weight side partitioned by a weight average molecular weight of 10,000 as a boundary each have one peak.

10. The adhesive according to claim 1, wherein, in an elution curve of a weight average molecular weight obtained by measuring the adhesive by gel permeation chromatography (GPC), proportions of a high molecular weight component and a low molecular weight component in an entire molecular weight distribution are such that an area of the high molecular weight component is 70 to 98%, and an area of the low molecular weight component is 2 to 30% with a weight average molecular weight of 10,000 as a boundary.

11. An adhesive tape, comprising:
   a base material; and
   an adhesive layer formed of the adhesive according to claim 1.

* * * * *